United States Patent
Kao et al.

(10) Patent No.: US 11,703,657 B2
(45) Date of Patent: Jul. 18, 2023

(54) ELECTROMAGNETIC DRIVING MECHANISM AND ASSEMBLY METHOD THEREOF

(71) Applicant: TDK TAIWAN CORP., Yangmei Taoyuan (TW)

(72) Inventors: Kuo-Chun Kao, Yangmei Taoyuan (TW); Nai-Wen Hsu, Yangmei Taoyuan (TW); Sin-Jhong Song, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

(21) Appl. No.: 15/805,825

(22) Filed: Nov. 7, 2017

(65) Prior Publication Data

US 2018/0196218 A1 Jul. 12, 2018

(30) Foreign Application Priority Data

Jan. 9, 2017 (TW) .................................. 106100587

(51) Int. Cl.
*G02B 7/06* (2021.01)
*G02B 7/02* (2021.01)
(Continued)

(52) U.S. Cl.
CPC ............... *G02B 7/06* (2013.01); *G02B 7/021* (2013.01); *G02B 7/09* (2013.01); *G02B 7/10* (2013.01); *G02B 27/646* (2013.01)

(58) Field of Classification Search
None
See application file for complete search history.

(56) References Cited

U.S. PATENT DOCUMENTS

2015/0296143 A1* 10/2015 Kang ................. H04N 5/23287
348/208.11
2016/0131923 A1* 5/2016 Hu .......................... G02B 7/10
359/557

FOREIGN PATENT DOCUMENTS

CN 204707016 U 10/2015
CN 204707016 U 10/2015
(Continued)

OTHER PUBLICATIONS

Taiwanese Office Action of corresponding TW Application No. 10620772410 dated Jul. 26, 2017, 7 pages.
(Continued)

*Primary Examiner* — Christopher Stanford
*Assistant Examiner* — Journey F Sumlar
(74) *Attorney, Agent, or Firm* — Muncy, Geissler, Olds & Lowe, P.C.

(57) ABSTRACT

An electromagnetic driving mechanism is provided for driving two different optical lenses, including a base, a first holder, a frame, a resilient element, a first electromagnetic driving assembly, a second holder, and a second electromagnetic driving assembly. The first and second holders are provided for holding the optical lenses. The frame is affixed to the base, has magnetically permeable material, and surrounds the first holder. The resilient element connects the first holder with the frame. The first electromagnetic driving assembly is disposed between the first holder and the frame to drive the first holder moving relative to the base. The second electromagnetic driving assembly is disposed on an outer side of the second holder to drive the second holder moving relative to the base.

19 Claims, 10 Drawing Sheets

(51) Int. Cl.
  *G02B 27/64* (2006.01)
  *G02B 7/09* (2021.01)
  *G02B 7/10* (2021.01)

(56) References Cited

FOREIGN PATENT DOCUMENTS

| TW | 201233003 A  | 8/2012  |
|----|--------------|---------|
| TW | 201233003 A1 | 8/2012  |
| TW | 201251277 A  | 12/2012 |
| TW | 201251277 A1 | 12/2012 |
| TW | 201701003 A  | 1/2017  |
| TW | 201701003 A  | 1/2017  |

OTHER PUBLICATIONS

Office Action dated Dec. 2, 2019 in corresponding CN Application No. 201711071702.9.

* cited by examiner

ELECTROMAGNETIC DRIVING MECHANISM AND ASSEMBLY METHOD THEREOF

CROSS REFERENCE TO RELATED APPLICATIONS

This application claims priority claims priority of Taiwan Patent Application No. 106100587 filed on Jan. 9, 2017, the entirety of which is incorporated by reference herein.

BACKGROUND OF THE DISCLOSURE

Field of the Invention

The present invention relates to a electromagnetic driving mechanism, and more particularly to an electromagnetic driving mechanism for driving a plurality of optical lenses.

Description of the Related Art

Conventional 3D photographing/stereo photography is usually accomplished by using two lens units which are separated by a specific distance. The two lens units can be operated under a specific parallelism of the optical axes and moved together by the same rotation/tilt angle (the same optical axis direction). The images captured by the lens units can be transferred via a specific display device such as 3D glasses and respectively to the left and right eyes of a user to generate a stereo vision effect.

In general, when the two lens units have a relatively large distance, the post processing of the images requires a longer processing time, and high image quality is usually hard to achieve. In contrast, if the two lens units have a small distance therebetween, the focusing time can be reduced, and clear images are easy to obtain. However, in a camera module provided with two lens units, an excessively short distance between the two lens units may lead to considerable magnetic interference therebetween, so that failure of a function such as optical image stabilization (OIS) of the electromagnetic driving mechanisms may occur. For the reasons described above, to design an electromagnetic driving mechanism in a dual-lens module of an electronic product with high performance and small dimensions has become an important issue.

BRIEF SUMMARY OF THE DISCLOSURE

Accordingly, one objective of the present invention is to provide an electromagnetic driving mechanism for driving a first optical lens and a second optical lens, including a base, a first holder holding the first optical lens, a frame affixed to the base, a resilient element connecting the first holder to the frame, a first electromagnetic driving assembly, a second holder holding the second optical lens and movably connecting to the base, and a second electromagnetic driving assembly. The frame is affixed to the base, having magnetically permeable material and surrounding the first holder. The first electromagnetic driving assembly is disposed between the first holder and the frame and driving the first holder to move relative to the base along a direction parallel to an optical axis of the optical lens. The second electromagnetic driving assembly is disposed on an outer side of the second holder and driving the second holder moving relative to the base.

According to some embodiments of the disclosure, the first electromagnetic driving assembly includes a magnetic element and a coil, the coil is disposed on the first holder, and the magnetic element is disposed on an inner side of the frame and corresponds to the coil.

According to some embodiments of the disclosure, the electromagnetic driving mechanism further includes shock absorbing material disposed between the frame and the first holder.

According to some embodiments of the disclosure, the first holder has a rib protruding from an outer surface of the first holder along a direction perpendicular to the optical axis, and the frame contacts the rib when the first holder moves relative to the frame along the optical axis.

According to some embodiments of the disclosure, the projections of the first holder and the frame onto a reference plane perpendicular to the optical axis at least partially overlap.

According to some embodiments of the disclosure, the second holder and the frame form a gap therebetween, and the second holder contacts the frame when the second holder moves relative to the base along a direction perpendicular to the optical axis.

According to some embodiments of the disclosure, the first holder and the base form a gap therebetween, and the first holder contacts the base when the first holder moves relative to the base along a direction perpendicular to the optical axis.

According to some embodiments of the disclosure, the frame comprises plastic material which covers a part of the magnetically permeable material.

According to some embodiments of the disclosure, the magnetically permeable material constitutes a main body of the frame, and the main body has a rectangular structure and four openings formed at four corners of the rectangular structure.

Another objective of the present invention is to provide an assembly method of the electromagnetic driving mechanism as described above, including the steps of: forming a first module by connecting the resilient element to the frame and the first holder and disposing the first electromagnetic driving assembly between the first holder and the frame; forming a second module by disposing the second holder on the base in a movable manner and disposing the second electromagnetic driving assembly on the outer side of the second holder; and affixing the frame of the first module to the base of the second module.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

While the invention has been described in connection with various aspects, it will be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1:
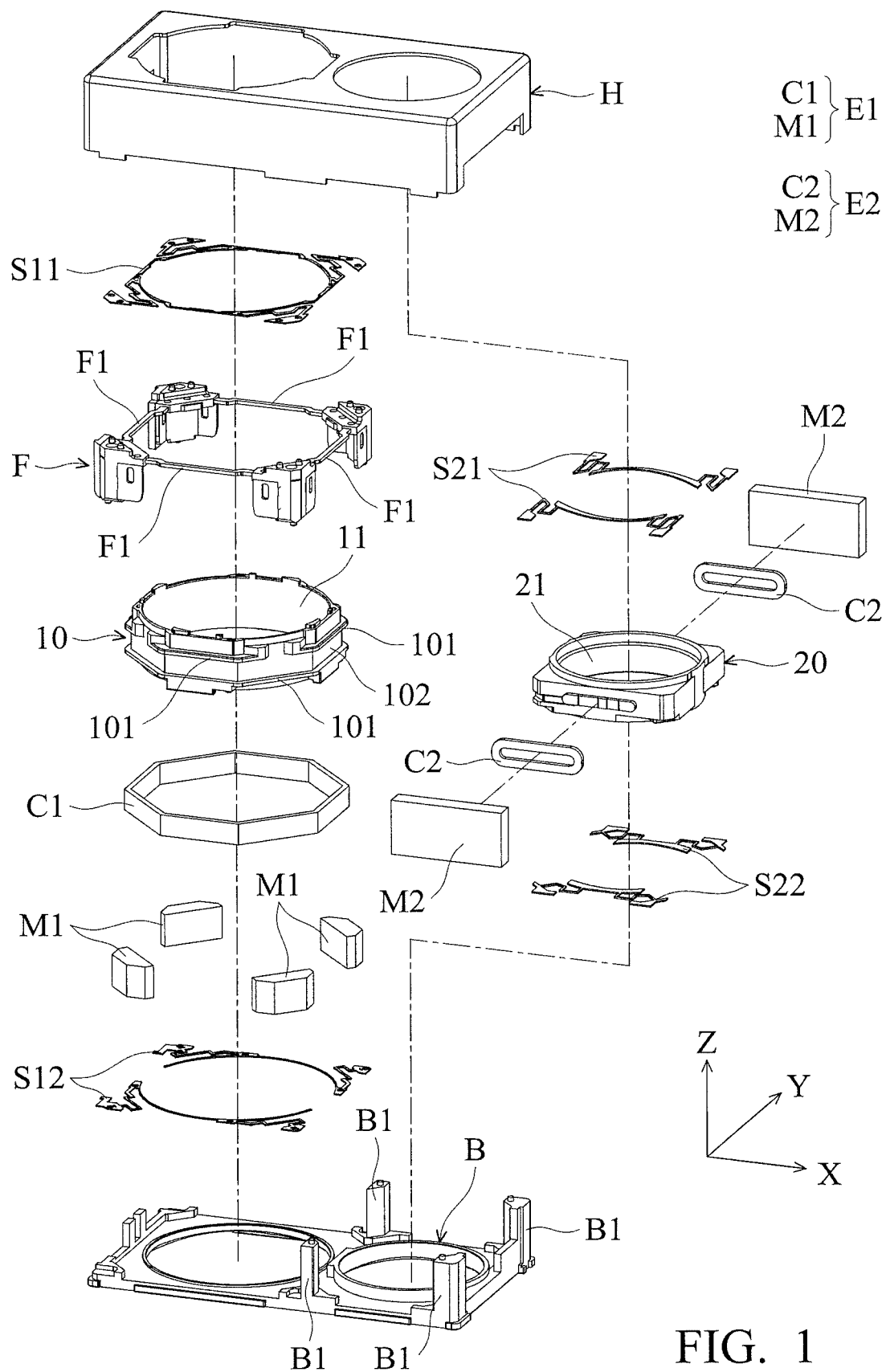
FIG. 1 shows an exploded diagram of an electromagnetic driving mechanism, in accordance with an embodiment of the invention.
Figure 2:
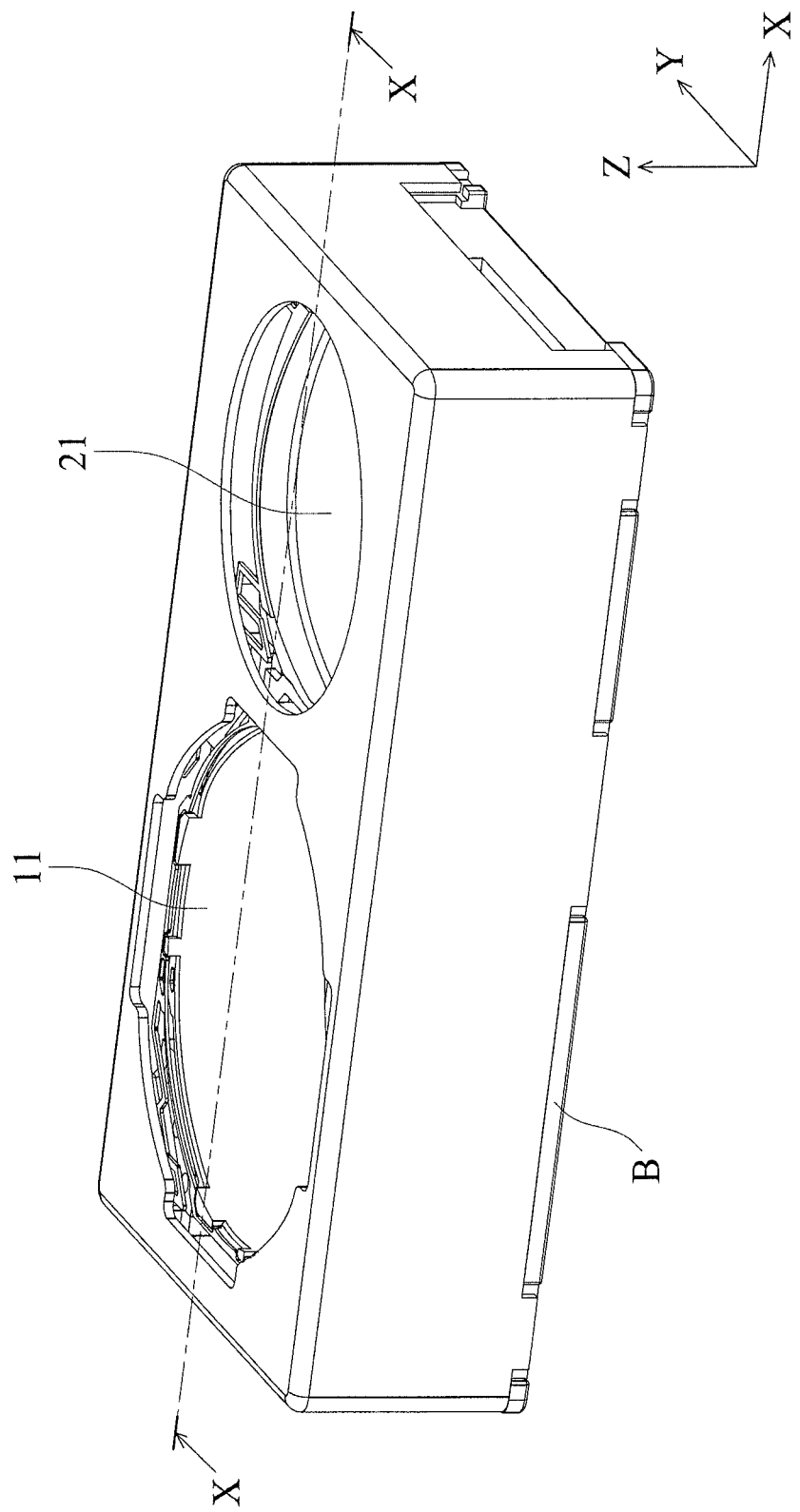
FIG. 2 shows a perspective diagram of the electromagnetic driving mechanism in FIG. 1 after assembly.

Referring to FIGS. 1 and 2, an electromagnetic driving mechanism according to an embodiment of the invention can be disposed in a camera device or an electronic device which has a camera module, wherein two different optical lenses can respectively moves along their optical axis to achieve auto focusing (AF) or optical image stabilization (OIS).

As shown in FIGS. 1 and 2, the electromagnetic driving mechanism primarily comprises a housing H, a base B, a first holder 10, a frame F, a first electromagnetic driving assembly E1 (including a coil C1 and several magnets MD, a second holder 20, a second electromagnetic driving assembly E2 (including several coils C2 and magnets M2), and a plurality of resilient elements S11, S12, S21, and S22. The first and second holders 10 and 20 are provided to hold two different optical lenses. The frame F has a substantially rectangular structure, and it is affixed to the base B and surrounds the first holder 10. The housing H and the base B are connected to each other with all the other components accommodated therein.

As shown in FIG. 1, the first holder 10 has a receiving space 11 for receiving a first optical lens (not shown). The resilient elements S11 and S12 are respectively disposed on an upper side and a lower side of the first holder 10, so as to movably connect the first holder 10 and the frame F. It should be noted that an outer surface of the first holder 10 forms several parallel ribs 101, and an annular recess 102 is formed between the ribs 101, so that the coil C1 can be easily wound around the first holder 10 and positioned in the recess 102 by automatic coil winding process. The four magnets M1 are respectively disposed at four corners on the inner side of the frame F, corresponding to the coil C1. When an electrical current is applied to the coil C1, a magnetic force is produced between the coil C1 and the magnets M1, so that the first holder 10 and the first optical lens received therein can move relative to the base B along the optical axis (Z axis) to achieve auto focusing (AF) or optical image stabilization (OIS).

In this embodiment, as the frame F comprises magnetically permeable material and surrounds the first holder 10, the intensity and uniformity of the magnetic field around the coil C1 and the magnets M1 can be efficiently improved, and the electromagnetic driving force of the first electromagnetic driving assembly E1 can also be increased. Moreover, when the first holder 10 moves upwardly relative to the base B along the Z axis by an external shock or a magnetic force, the rod portions F1 of the frame F can contact the ribs 101 and restrict the first holder 10 at a limit height. Therefore, direct collision between the first holder 10 and the housing H located above the rod portions F1 can be prevented, and there is no need to provide other stopper or restricting structure on the first holder 10.

Additionally, since the resilient elements S11 and S12 on the upper and lower sides of the first holder 10 are extended outwardly and are both connected to the same frame F, the assembly tolerance can be greatly reduced. When compared to conventional resilient elements which are usually connected to different components and result in considerable assembly tolerance, the present invention can efficiently prevent tilt of the optical lens after assembly and therefore improve the performance of the electromagnetic driving mechanism.

It should be noted that the positions of the coil C1 and the magnets M1 may also be exchanged. In some embodiments, several magnets may be disposed on the outer surface of the first holder 10, and a coil may be disposed on the inner surface of the frame F, corresponding to the magnets, so that the first holder 10 and the first optical lens can also be driven to move along the optical axis (Z axis).

Still referring to FIGS. 1 and 2, the second holder 20 has a receiving space 21 for accommodating a second optical lens (not shown). The resilient elements S21 and S22 are respectively disposed on the upper and lower sides of the second holder 20. Specifically, the resilient elements S21 are extended outwardly from the upper surface of the second holder 20 to the pillar portions B1 of the base B, so that the second holder 20 is movable relative to the base B along the Z axis. It should be noted that two oval-shaped coils C2 are disposed on an outer surface of the second holder 20, and two magnets M2 are disposed between the coils C2 and the housing H, corresponding to the coils C2. When an electrical current is applied to the coil C2, a magnetic force is produced between the coil C2 and the magnets M2, so that the second holder 20 and the second optical lens received therein can move relative to the base B along the optical axis (Z axis) to achieve auto focusing (AF) or optical image stabilization (OIS). It should be noted that the positions of the coils C2 and the magnets M2 may also be exchanged. In some embodiments, several magnets may be disposed on the outer surface of the second holder 20, and one or several coils may be disposed between the magnets and the housing 10, corresponding to the magnets, so that the second holder 20 and the second optical lens can also be driven to move along the optical axis (Z axis).

Figure 3A:
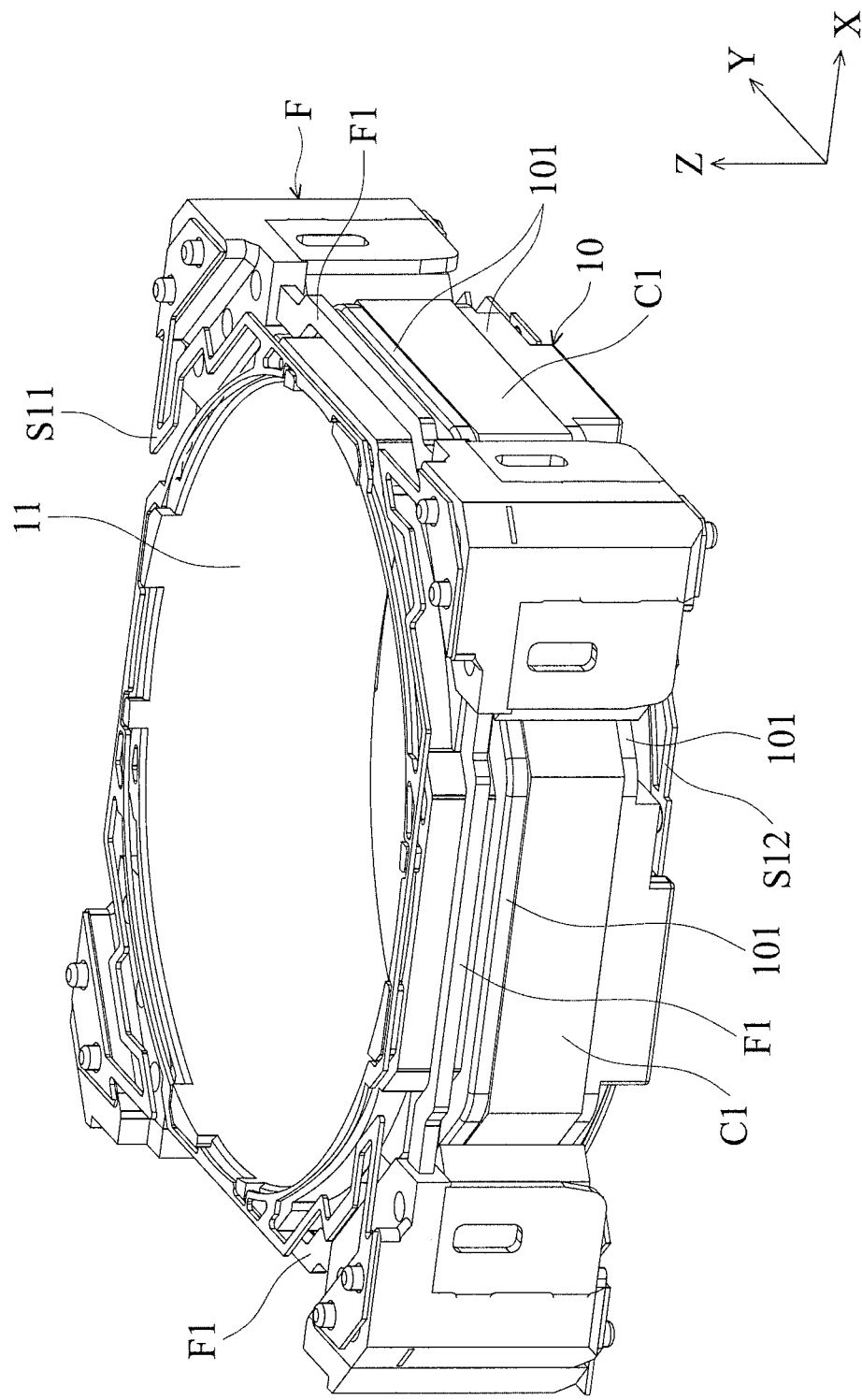
FIGS. 3A-3C show perspective diagrams of a first module formed by the first holder 10, the frame F, the coil C1, the magnets M1, and the resilient elements S11 and S12.
Figure 3B:
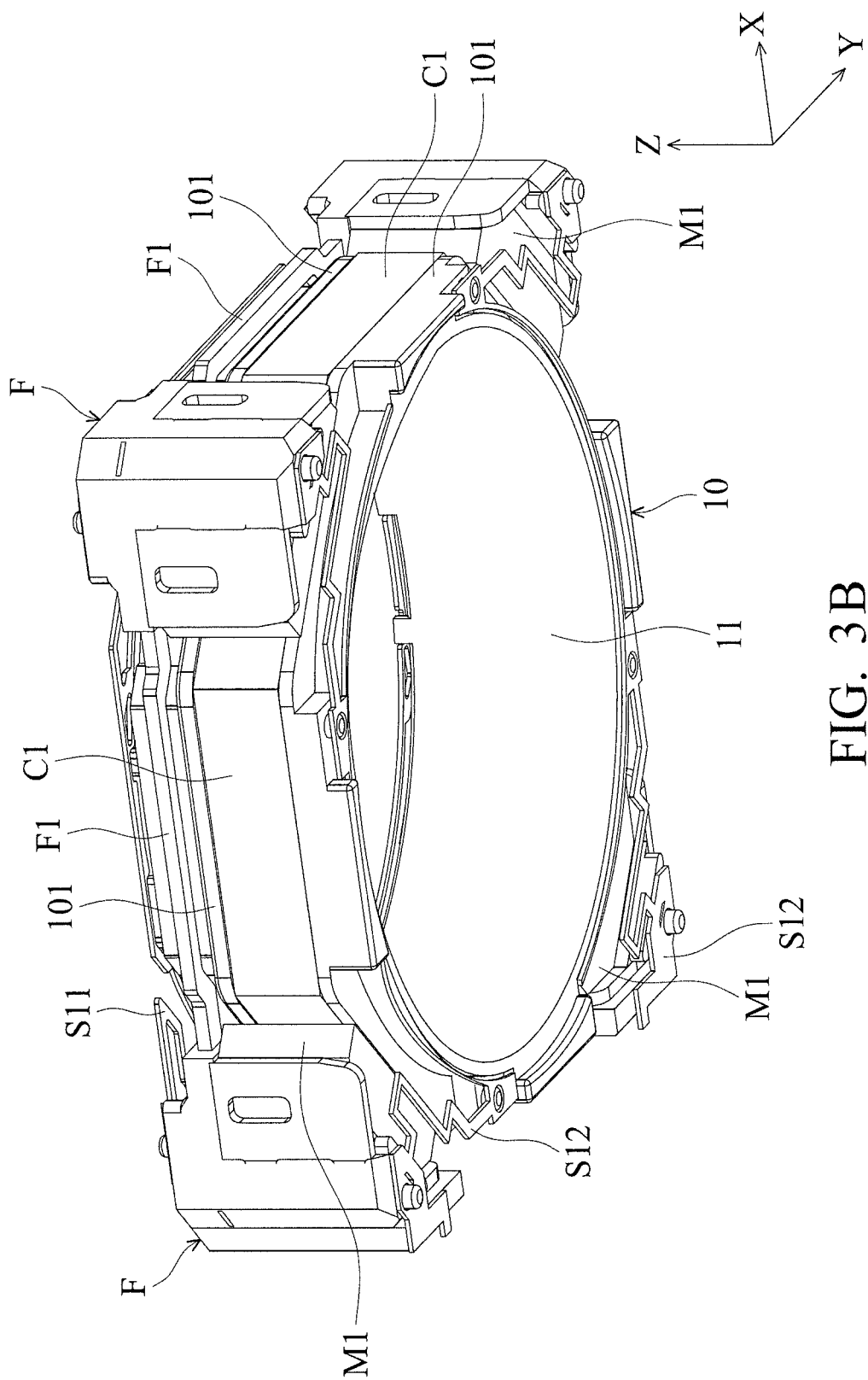
Figure 3C:
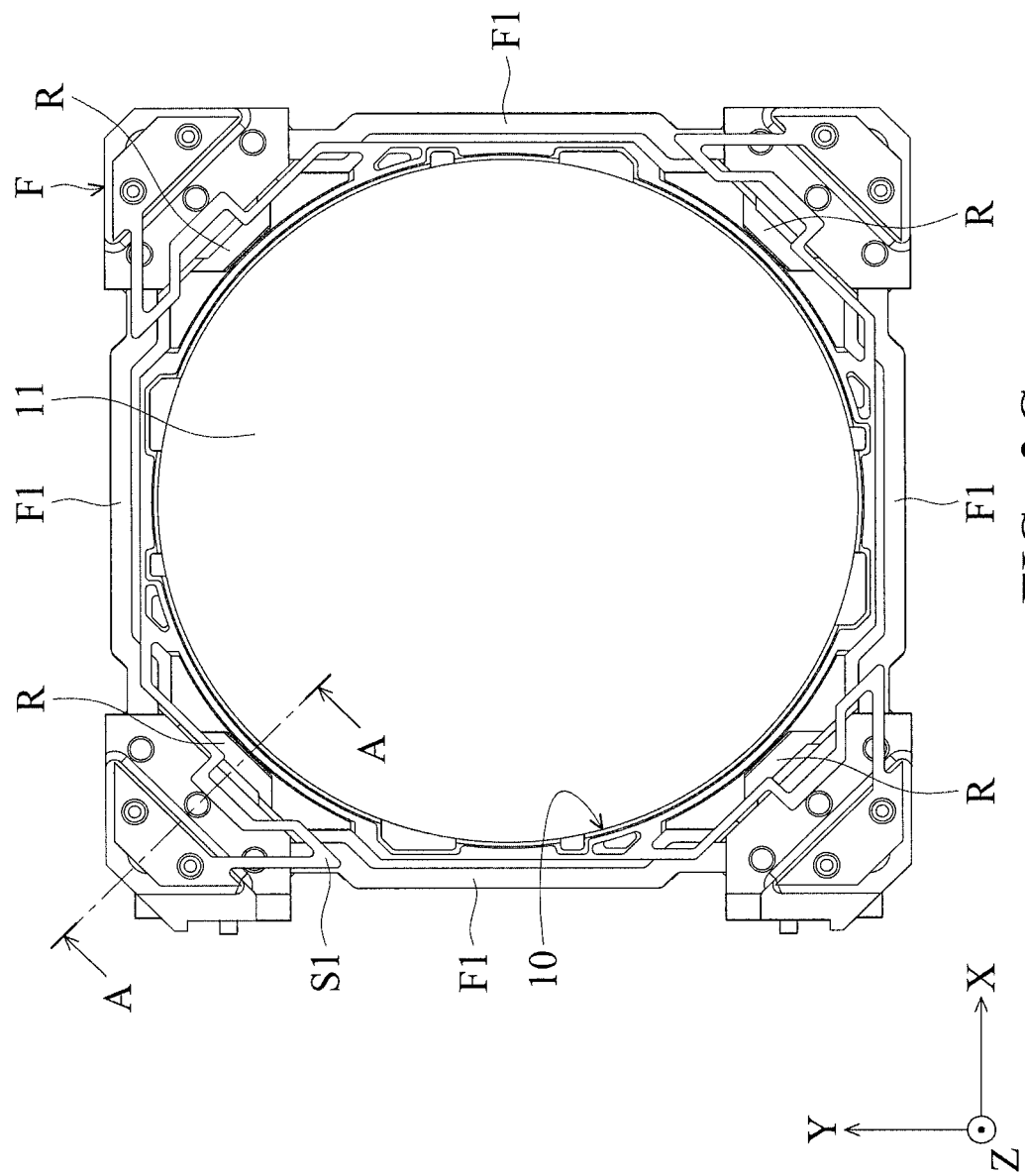

Referring to FIGS. 1 and 3A-3C, the first holder 10, the frame F, the coil C1, the magnets M1, and the resilient elements S11 and S12 can be assembled as a first module in advance, wherein the first electromagnetic driving assembly E1 (including the coil C1 and the magnets M1) is disposed between the first holder 10 and the frame F. As shown in FIGS. 3A-3C, the resilient elements S11 and S12 connect to the frame F from the upper and lower sides of the first holder 10, and the four rod portions F1 of the frame F are respectively located above the four ribs 101 formed on the outer surface of the first holder 10. That is, the projections of the ribs 101 and the frame F (rod portions F1) onto a reference plane (XY plane) perpendicular to the optical axis (Z axis) at least partially overlap. Therefore, when the first holder 10 moves upwardly along the Z axis relative to the frame F and the base B, the rod portions F1 can be utilized as stoppers to contact the ribs 101, so that the first holder 10 is restricted at a limit height, and direct collision between the first holder 10 and the housing H located above the rod portions F1 can be efficiently prevented.

Figure 3D:
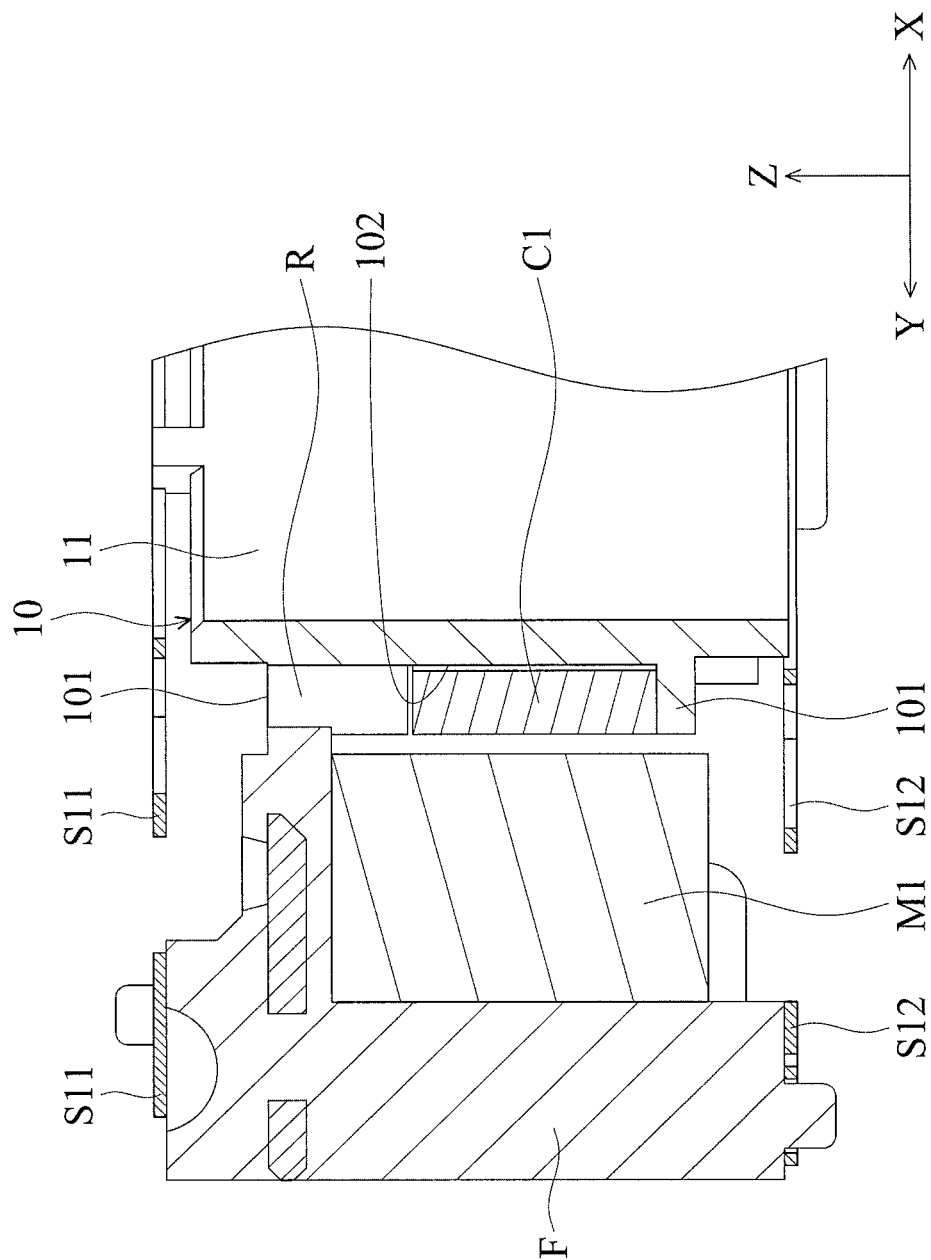
FIG. 3D shows a cross-sectional view along line A-A in FIG. 3C

FIG. 3D shows a cross-sectional view along line A-A in FIG. 3C. Referring to FIGS. 3B-3D, the magnets M1 are disposed at the corners on the inner side of the frame F, and are spaced apart from the coil C. Specifically, four recesses R are formed at four corners of the first holder 10 and adjacent to the frame F. Shock absorbing material, such as gel or other damping element, may be disposed in the recesses R to connect the frame F to the first holder 10, so that external shocks can be absorbed to prevent direct collision between the first holder 10 and the frame F along a horizontal direction parallel to the XY plane.

Figure 3E:
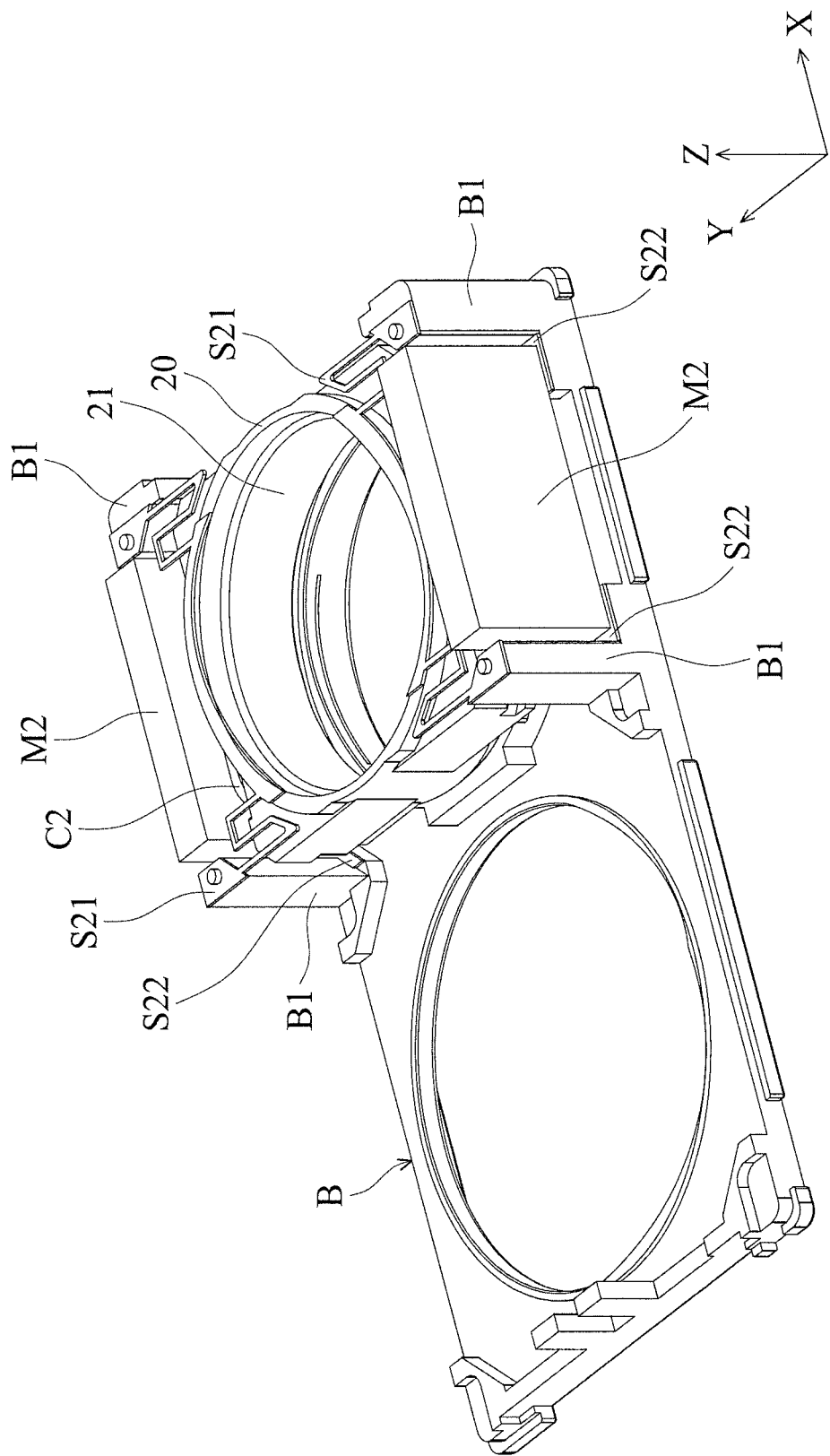
FIG. 3E shows a perspective diagram of a second module formed by the second holder 20, the coils C2, the magnets M2, the resilient elements S21 and S22, and the base B.

Referring to FIG. 3E, the second holder 20, the coils C2, the magnets M2, the resilient elements S21 and S22, and the base B can also be assembled as a second module in advance, wherein the second electromagnetic driving assembly E2 (including the coils C2 and the magnets M2) is disposed on the outer side of the second holder 20. As shown in FIG. 3E, the resilient elements S21 and S22 are extended from the upper and lower sides of the second holder 20 to the base B. Specifically, the resilient elements S21 are extended from the upper surface of the second holder 20 to the pillar portions B1 of the base B, so that the second holder 20 and the second optical lens received therein are movable relative to the base B along the optical axis (Z axis).

It should be noted that the first and second modules in this embodiment can be respectively assembled and tested in advance. After the functional test of the first and second modules, they can be assembled to each other by mounting the frame F of the first module to the base B of the second module. This modularized assembly process has the advantage that when either of the first module or the second module fails the functional test, it can be promptly detected and rejected, so that the cost of abandoned products which fail in the functional test after assembly can be efficiently reduced, and the reliability and the yield rate of the products can therefore be increased.

Figure 4A:
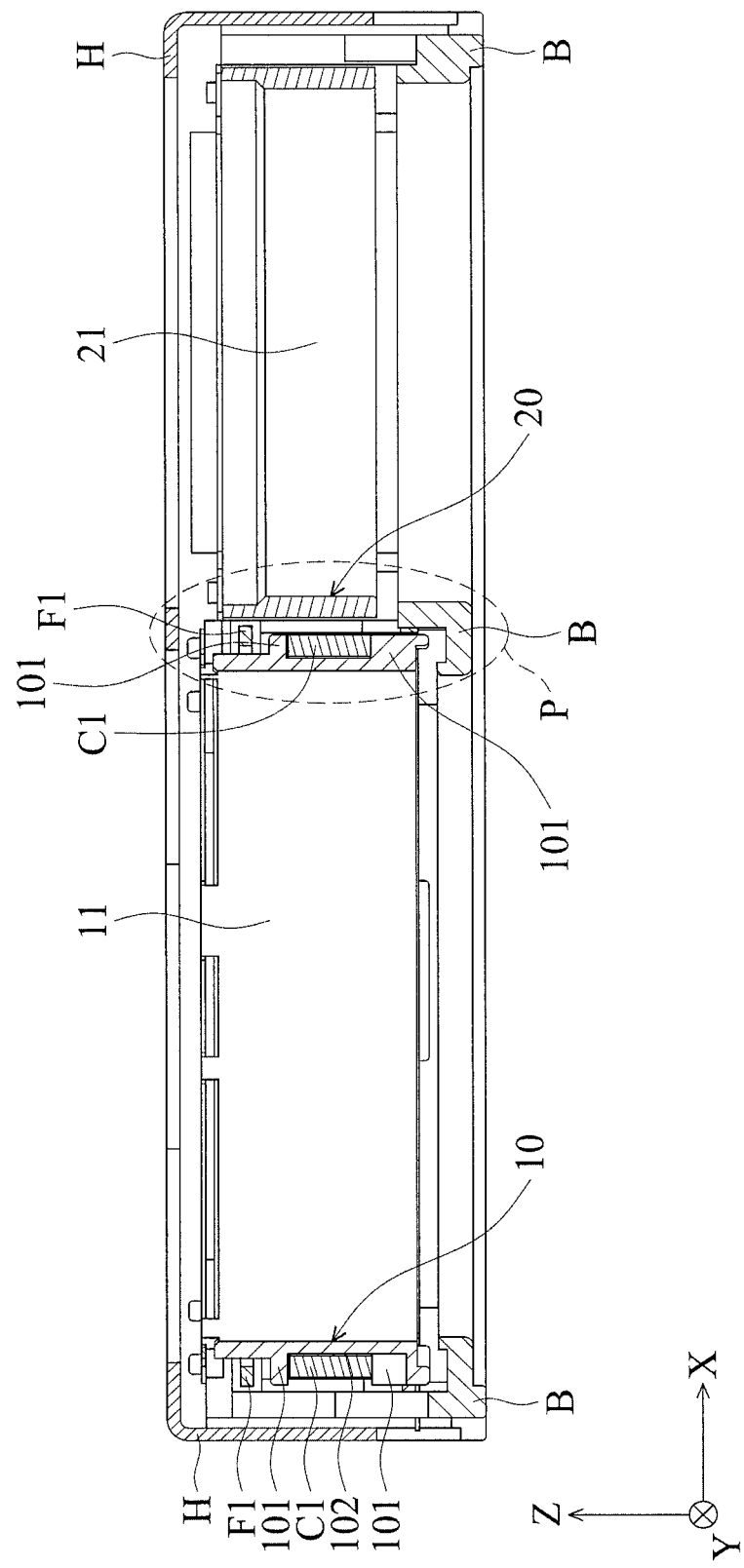
FIG. 4A shows a cross-sectional view along line X-X in FIG. 2.
Figure 4B:
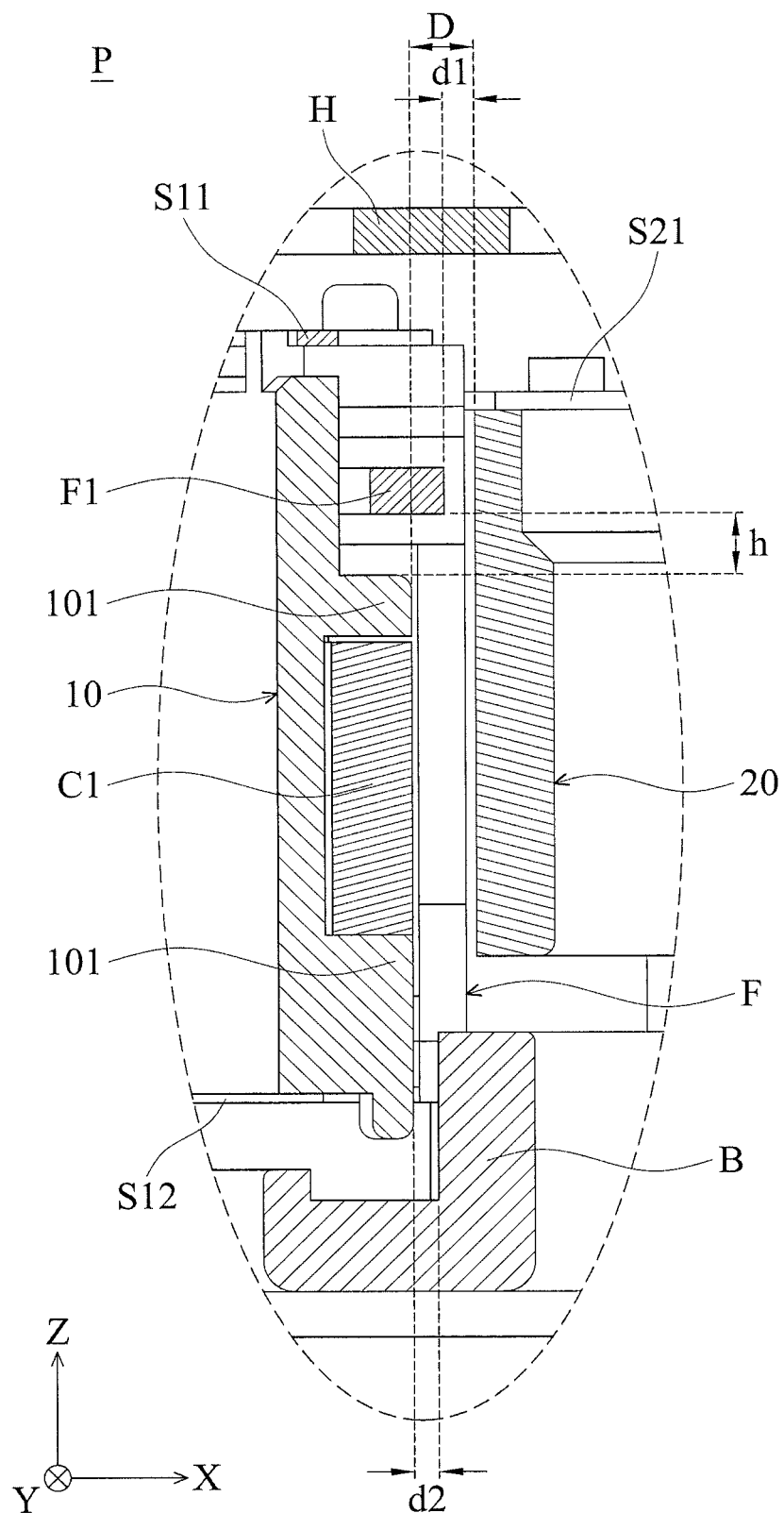
FIG. 4B shows an enlarged view of the portion P in FIG. 4A.

FIG. 4A shows a cross-sectional view along line X-X in FIG. 2, and FIG. 4B shows an enlarged view of the portion P in FIG. 4A. Referring to FIGS. 4A and 4B, after assembly of the electromagnetic driving mechanism, the first and second holders 10 and 20 are spaced apart from each other by a distance D along the X axis, and the second holder 20 and the frame F have a distance d1 therebetween, wherein d1<D. When the second holder 20 encounters an impact or shock and moves to the left along the −X direction, the second holder 20 will contact the rod portion F1 but not collide with the first holder 10. Therefore, the first holder 10 and the first optical lens received therein can be prevented from tilting or deviation due to the impact from the second holder 20. Similarly, FIG. 4B shows that the first holder 10 and the base B have a distance d2 therebetween, wherein d2<D. When the first holder 10 encounters an impact or shock and moves to the right along the X direction, the first holder 10 will contact the base B but not collide with the second holder 20. Therefore, the second holder 20 and the second optical lens received therein can be prevented from tilting or deviation due to the impact from the first holder 10.

Figure 5:
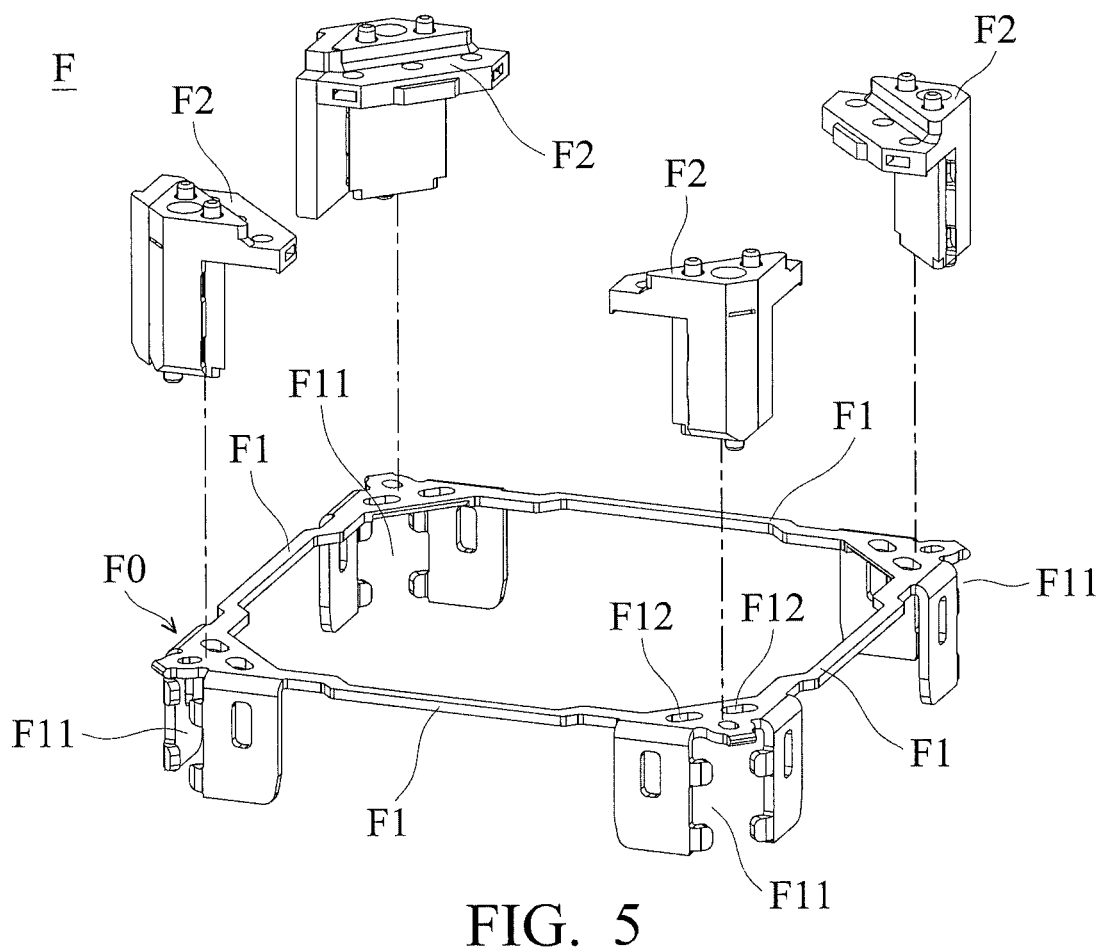
FIG. 5 shows an exploded diagram of a frame, in accordance with an embodiment of the invention.

Referring to FIG. 5, the frame F in this embodiment primarily comprises a main body F0 and several protection members F2. The main body F0 may comprise metal and have a substantially rectangular structure. Specifically, the main body F0 is magnetically permeable, forming an opening F11 and at least a through hole F12 at the four corners thereof. It should be noted that the protection members F2 may comprise plastic material, and they can be formed at the four corners of the main body F0 to partially cover the main body F0 and extend into the opening F11 and the through holes F12. As the protection members F2 have high plasticity, they are easy to design and form in a specific shape (such as a structure for joining with other components). Additionally, the protection members F2 can also protect the frame F and enhance the structural strength of the frame F, and they can reduce the weight of the entire frame F to achieve light weight of the product.

Figure 6:
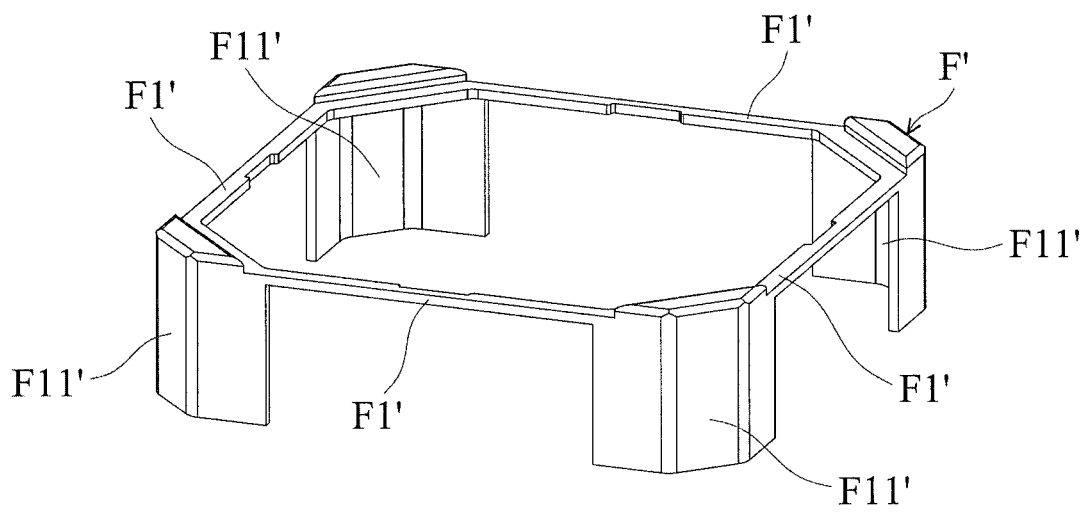
FIG. 6 shows a perspective diagram of a frame, in accordance with another embodiment of the invention.

The frame F shown in FIGS. 1-5 can be replaced by the frame F' shown in FIG. 6, according to another embodiment of the invention. The frame F' in this embodiment can be entirely made by magnetically permeable material, wherein four receiving portions F11' are formed at the four corners of the frame F' for receiving the first magnets M1. It should be noted that both the frame F and F' in FIGS. 5 and 6 comprise magnetically permeable material and surround the first holder 10, so that the intensity and uniformity of the magnetic field near the coil C1 and the magnets M1 can be efficiently improved, and the electromagnetic driving force of the first electromagnetic driving assembly E1 can also be enhanced.

In summary, the invention provides an electromagnetic driving mechanism for driving two different optical lenses, wherein a frame having magnetically permeable material is disposed around a first holder, so as to improve the intensity and uniformity of the magnetic field near the coil and the magnets. Additionally, when the first holder encounters an impact or shock and moves relative to the base, the first holder will contact the rod portion of the frame, so as to restrict the first holder at a limit height and prevent direct collision between the first holder and the housing located above the rod portion.

Moreover, as the resilient members are extended from the upper and lower sides of the first holder to the same frame, the assembly tolerance can be greatly reduced, and tilt of the optical lens after assembly can therefore be prevented. Another advantage of the invention is the modularized assembly process, wherein failure of the first module or the second module can be promptly detected, so that the cost of abandoned products can be efficiently reduced, and the reliability and the yield rate of the products can therefore be increased.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electromagnetic driving mechanism for driving a first optical lens, comprising:
    a base;
    a case affixed on the base, wherein the case comprises a
        case top wall and a case sidewall, the case top wall and the case sidewall are plate-shaped and are not parallel to each other, and the base and the case form an accommodating space;

a first holder, disposed in the accommodating space and used for connecting the first optical lens, and the case sidewall is parallel to a first optical axis of the first optical lens;

a frame affixed to the case and disposed in the accommodating space, having magnetically permeable material and surrounding the first holder, wherein the frame comprises a side wall having a plate-shape and parallel to the first optical axis;

a first resilient element connecting the first holder and the frame;

a second resilient element connecting the first holder and the frame, wherein the first resilient element and the second resilient element are disposed on opposite sides of the frame; and a first electromagnetic driving assembly, disposed between the first holder and the frame, driving the first holder to move relative to the base along a direction parallel to the first optical axis;

when viewed along the optical axis, at least a portion of the side wall is disposed between the case sidewall and a first magnetic element of the first electromagnetic driving assembly;

when viewed along a thickness direction of the side wall, the side wall, the case sidewall, the first magnetic element, and a driving coil of the first electromagnetic driving assembly at least partially overlap each other;

wherein a first protrusion of the frame extends through the first resilient element, and a second protrusion of the frame extends through the second resilient element.

2. The electromagnetic driving mechanism as claimed in claim 1, wherein the first electromagnetic driving assembly includes a coil, the coil is disposed on the first holder, and the first magnetic element is disposed on an inner side of the frame and corresponds to the coil.

3. The electromagnetic driving mechanism as claimed in claim 1, further comprising shock absorbing material disposed between the frame and the first holder.

4. The electromagnetic driving mechanism as claimed in claim 1, wherein the first holder has a rib protruding from an outer surface of the first holder along a direction perpendicular to the first optical axis, and the frame contacts the rib when the first holder moves relative to the frame along the first optical axis.

5. The electromagnetic driving mechanism as claimed in claim 1, wherein the projections of the first holder and the frame onto a reference plane perpendicular to the first optical axis at least partially overlap.

6. The electromagnetic driving mechanism as claimed in claim 1, further comprising a second holder, wherein the second holder and the frame form a gap therebetween, and the second holder contacts the frame when the second holder moves relative to the base along a direction perpendicular to the first optical axis.

7. The electromagnetic driving mechanism as claimed in claim 1, wherein the first holder and the base form a gap therebetween, and the first holder contacts the base when the first holder moves relative to the base along a direction perpendicular to the first optical axis.

8. An assembly method of the electromagnetic driving mechanism as claimed in claim 1, comprising:

forming a first module by connecting the resilient element to the frame and the first holder and disposing the first electromagnetic driving assembly between the first holder and the frame;

forming a second module by disposing the second holder on the base in a movable manner and disposing the second electromagnetic driving assembly on the outer side of the second holder; and affixing the frame of the first module to the base of the second module.

9. The assembly method as claimed in claim 8, wherein the first electromagnetic driving assembly includes a coil, the coil is disposed on the first holder, and the first magnetic element is disposed on an inner side of the frame and corresponds to the coil.

10. The assembly method as claimed in claim 8, further comprising shock absorbing material disposed between the frame and the first holder.

11. The assembly method as claimed in claim 8, wherein the first holder has a rib protruding from an outer surface of the first holder along a direction perpendicular to the first optical axis, and the frame contacts the rib when the first holder moves relative to the frame along the first optical axis.

12. The assembly method as claimed in claim 8, wherein the projections of the first holder and the frame onto a reference plane perpendicular to the first optical axis at least partially overlap.

13. The assembly method as claimed in claim 8, wherein the second holder and the frame form a gap therebetween, and the second holder contacts the frame when the second holder moves relative to the base along a direction perpendicular to the first optical axis.

14. The assembly method as claimed in claim 8, wherein the first holder and the base form a gap therebetween, and the first holder contacts the base when the first holder moves relative to the base along a direction perpendicular to the first optical axis.

15. The assembly method as claimed in claim 1, wherein the frame comprises:

a main body having a plurality of through holed; and protection members extending into the through holes.

16. The assembly method as claimed in claim 15, wherein the main body comprises:

a rod portion extending in a first direction; and an extending portion extending in the direction parallel to the first optical axis and is different from the first direction, wherein an opening is formed on the extending portion.

17. The assembly method as claimed in claim 1, wherein in the direction parallel to the first optical axis, a distance between a top surface of the first protrusion and the second resilient element is greater than a distance between a top surface of the first holder and the second resilient element.

18. An electromagnetic driving mechanism for driving a first optical lens, comprising:

a case affixed on the base, wherein the case comprises a case top wall and a case sidewall, the case top wall and the case sidewall are plate-shaped and are not parallel to each other, and the base and the case form an accommodating space;

a first holder, disposed in the accommodating space and used for connecting the first optical lens, and the case sidewall is parallel to a first optical axis of the first optical lens;

a frame affixed to the case and disposed in the accommodating space, having magnetically permeable material and surrounding the first holder, wherein the frame comprises a plurality of side walls, wherein each of the side walls has a plate-shape and parallel to the first optical axis, and the side walls are not continuous and separated from each other;

a first resilient element connecting the first holder and the frame;

a second resilient element connecting the first holder and the frame, wherein the first resilient element and the second resilient element are disposed on opposite sides of the frame; and a first electromagnetic driving assembly, disposed between the first holder and the frame, driving the first holder to move relative to the base along a direction parallel to the first optical axis;

when viewed along the optical axis, at least a portion of the side wall is disposed between the case sidewall and a first magnetic element of the first electromagnetic driving assembly;

when viewed along a thickness direction of the side wall, the side wall, the case sidewall, the first magnetic element, and a driving coil of the first electromagnetic driving assembly at least partially overlap each other;

wherein a first protrusion of the frame extends through the first resilient element, and a second protrusion of the frame extends through the second resilient element.

19. An electromagnetic driving mechanism for driving a first optical lens, the electromagnetic driving mechanism comprising:

a case comprises a case top wall and a case sidewall, wherein the case sidewall extends from an edge of the case top wall along a main axis, and the case top wall and the case sidewall are plate-shaped and are not parallel to each other;

a first holder used for connecting the first optical lens having an optical axis;

a frame affixed on the case, having magnetically permeable material, wherein the frame comprises a side wall having a plate-shape;

a first resilient element connecting the first holder and the frame;

a second resilient element connecting the first holder and the frame, wherein the first resilient element and the second resilient element are disposed on opposite sides of the frame; and a first electromagnetic driving assembly, used for driving the first holder to move relative to the case and the frame, wherein a first magnetic element of the first electromagnetic driving assembly is affixed on the frame;

when viewed along the optical axis, the side wall is disposed between the case sidewall and a first magnetic element;

when viewed along a thickness direction of the side wall, the side wall, the case sidewall, the first magnetic element, and a driving coil of the first electromagnetic driving assembly at least partially overlap each other;

wherein a first protrusion of the frame extends through the first resilient element, and a second protrusion of the frame extends through the second resilient element.

* * * * *